(12) United States Patent
Shiiba et al.

(10) Patent No.: US 8,411,009 B2
(45) Date of Patent: Apr. 2, 2013

(54) LIQUID CRYSTAL DISPLAY DEVICE AND METHOD FOR DRIVING THE SAME

(75) Inventors: Ken Shiiba, Ishikawa-ken (JP); Yukio Tanaka, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 597 days.

(21) Appl. No.: 12/626,782

(22) Filed: Nov. 27, 2009

(65) Prior Publication Data

US 2010/0245697 A1 Sep. 30, 2010

(30) Foreign Application Priority Data

Mar. 26, 2009 (JP) ................................. 2009-076653

(51) Int. Cl.
*G11B 3/36* (2006.01)

(52) U.S. Cl. ................ 345/95; 345/87; 345/89; 345/92; 345/96; 345/100

(58) Field of Classification Search .................. None
See application file for complete search history.

(56) References Cited

U.S. PATENT DOCUMENTS

| | | | | |
|---|---|---|---|---|
| 7,460,114 | B2* | 12/2008 | Mizumaki | 345/204 |
| 7,872,624 | B2* | 1/2011 | Igarashi et al. | 345/87 |
| 2002/0154084 | A1* | 10/2002 | Tanaka et al. | 345/92 |
| 2007/0057887 | A1* | 3/2007 | Itakura et al. | 345/90 |
| 2007/0076160 | A1 | 4/2007 | Shiba et al. | |
| 2008/0231641 | A1* | 9/2008 | Miyashita | 345/619 |
| 2008/0278647 | A1 | 11/2008 | Fukami et al. | |
| 2009/0051641 | A1* | 2/2009 | Irie et al. | 345/96 |
| 2009/0109361 | A1* | 4/2009 | Ishii | 349/39 |
| 2009/0303168 | A1* | 12/2009 | Nagata | 345/90 |
| 2010/0033460 | A1* | 2/2010 | Numao | 345/211 |
| 2010/0128012 | A1* | 5/2010 | Numao | 345/211 |

FOREIGN PATENT DOCUMENTS

| | | |
|---|---|---|
| JP | 2002-72989 | 3/2002 |
| JP | 2003-280036 | 10/2003 |
| JP | 2003-295157 | 10/2003 |
| JP | 2004-317785 | 11/2004 |
| JP | 2005-49849 | 2/2005 |

OTHER PUBLICATIONS

U.S. Appl. No. 12/771,191, filed Apr. 30, 2010, Tanaka, et al.
Office Action issued Jun. 28, 2011, in Japanese Patent Application No. 2009-076653 (English translation only).
U.S. Appl. No. 13/220,932, filed Aug. 30, 2011, Tanaka, et al.
U.S. Appl. No. 12/877,551, filed Sep. 8, 2010, Tanaka, et al.

* cited by examiner

*Primary Examiner* — Dismery Mercedes
(74) *Attorney, Agent, or Firm* — Oblon, Spivak, McClelland, Maier & Neustadt, L.L.P.

(57) ABSTRACT

A liquid crystal display device comprises a display area including a plurality of pixels arranged in a matrix. A driving unit to drive the plurality of pixels each having a pixel switch is connected to signal lines and scan lines. An auxiliary capacitance voltage is interposed to a pixel electrode connected to the pixel switch through auxiliary capacitance lines arranged along the pixels in a row direction. The driving unit includes an auxiliary capacitance line driving circuit to supply a first voltage, a second voltage smaller than the first voltage and a third voltage smaller than the second voltage to the auxiliary capacitance lines. The voltage difference between the first voltage and the second voltage is smaller than that between the second voltage and the third voltage.

5 Claims, 5 Drawing Sheets

LIQUID CRYSTAL DISPLAY DEVICE AND METHOD FOR DRIVING THE SAME

CROSS-REFERENCE TO RELATED APPLICATION

This application is based upon and claims the benefit of priority from prior Japanese Patent Application No. 2009-076653, filed Mar. 26, 2009, and the entire contents of which are incorporated herein by reference.

BACKGROUND OF THE INVENTION

1. Field of the Invention

The present invention relates to a liquid crystal display device, and more particularly, to an active matrix type liquid crystal display device capable of reducing power consumption and preventing degradation of display quality.

2. Description of the Background Art

The liquid crystal display device includes a display panel and a control circuit to control the liquid crystal display panel. The liquid crystal display panel also includes a pair of substrates facing each other, a liquid crystal layer held by the pair of substrates and a display area having a plurality of pixels arranged in a matrix. The display area includes scan lines along pixels arranged in a row direction and signal lines along pixels arranged in a column direction. Each pixel includes a pixel electrode and a switch element that connects the pixel electrode to the signal line.

Generally, the liquid crystal display device adopts an alter electric field driving, that is, a polarity of voltage applied to the liquid crystal layer is reversed in every selected scan line as countermeasure against flicker. However, if only one of the polarity changes in every selected scan line and every selected signal line is adopted, flicker may be generated in a direction in which the scan lines or the signal lines extend. Accordingly, in a high quality liquid crystal display device, a dot inversion driving in which the polarity of the voltage applied to the liquid crystal layer is reversed both in every selected scan line and every selected signal line. For example, Japanese laid open patent application No. 2003-280036 discloses such technique.

On the other hand, a capacitance coupling driving (CC driving) is proposed to decrease the amplitude of signal voltages. In the capacitance coupling driving, a predetermined pixel voltage is obtained by adding an auxiliary capacitance signal to the pixel electrode through an auxiliary capacitance. If the capacitance values of the auxiliary capacitance and a pixel capacitance are set substantially equal, the amplitude of the signal voltage may be reduced by half. Japanese laid open patent application No. 2005-49849 describes a capacitance coupling dot inversion driving (CCDI driving) in which the dot inversion driving is combined with the capacitance coupling driving (CC driving). In the liquid crystal display device, a black insertion driving in which a signal corresponding to black display is applied to the pixel to achieve a clearer picture.

When small amplitude of the signal voltage is required, the CCDI driving is adopted. Further, when the black insertion driving is conducted, two time scan, that is, a scan for the black insertion driving and a scan for writing image signals into the pixel are necessary within one frame scan period (1 vertical scan period). After finishing the scan period, the voltage of the auxiliary capacitance signal changes to the same polarity side as the written image signal. If the auxiliary capacitance signal changes to an opposite polarity side to the written signal, which results in difficulty of the alternate driving in every vertical scan period. Furthermore, when the capacitance coupling driving is conducted, the pixel electrode voltage may exceed "off" voltage of the switching element owing to superposing of the auxiliary capacitance signal voltage. In this case, a displayed image quality may be reduced due to current leak from the switching element, which results in decrease of the voltage applied to the liquid crystal layer.

On the other hand, when the black insertion is conducted, it is possible to set the superposed voltage of the auxiliary capacitance signals for the black insertion and the image display at different values each other. However, center voltages applied to the liquid crystal layer may shift to different ones when the black signal and the image signal are written into the pixel electrode. In such a case, a direct current component (DC) may be supplied to the liquid crystal layer. The shift of the center voltages may result in image persistence or display unevenness.

BRIEF SUMMARY OF THE INVENTION

The present invention has been made to address the above mentioned problems. One object of this invention is to provide a liquid crystal display device capable of reducing power consumption and preventing degradation of the display quality.

Thus, according to one aspect of the invention, there is provided a liquid crystal display device including: an array substrate and a counter substrate facing each other; a liquid crystal layer interposed between the array substrate and the counter substrate; a display area formed of the array substrate, the counter substrate and the liquid crystal layer and including a plurality of pixels arranged in a matrix; a driving unit to drive the plurality of pixels connected to signal lines and scan lines arranged in a matrix; a pixel electrode provided to each pixel; a common electrode formed on the counter substrate and facing the pixel electrode; an auxiliary capacitance provided to each pixel to interpose auxiliary capacitance signal to the pixel electrode; and auxiliary capacitance lines arranged along the pixels in a row direction and connected to the auxiliary capacitance of the pixel, and wherein the driving unit includes an auxiliary capacitance line driving circuit to supply a first voltage, a second voltage smaller than the first voltage and a third voltage smaller than the second voltage to the auxiliary capacitance line, and the voltage difference between the first voltage and the second voltage is smaller than that between the second voltage and the third voltage.

According to another aspect of the invention, there is provided a method for driving a liquid crystal display device including a plurality of pixels arranged near intersections between signal lines and scan lines in a matrix comprising the steps: providing a driving unit to drive the plurality of pixels each having a pixel switch connected to the signal line and the scan line; forming auxiliary capacitances in the respective pixels; providing auxiliary capacitance lines arranged along the pixels and connected to the auxiliary capacitances; supplying a first voltage, a second voltage smaller than the first voltage, a third voltage smaller than the second voltage to the auxiliary capacitance lines, and the voltage difference between the first voltage and the second voltage is smaller than that between the second voltage and the third voltage.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
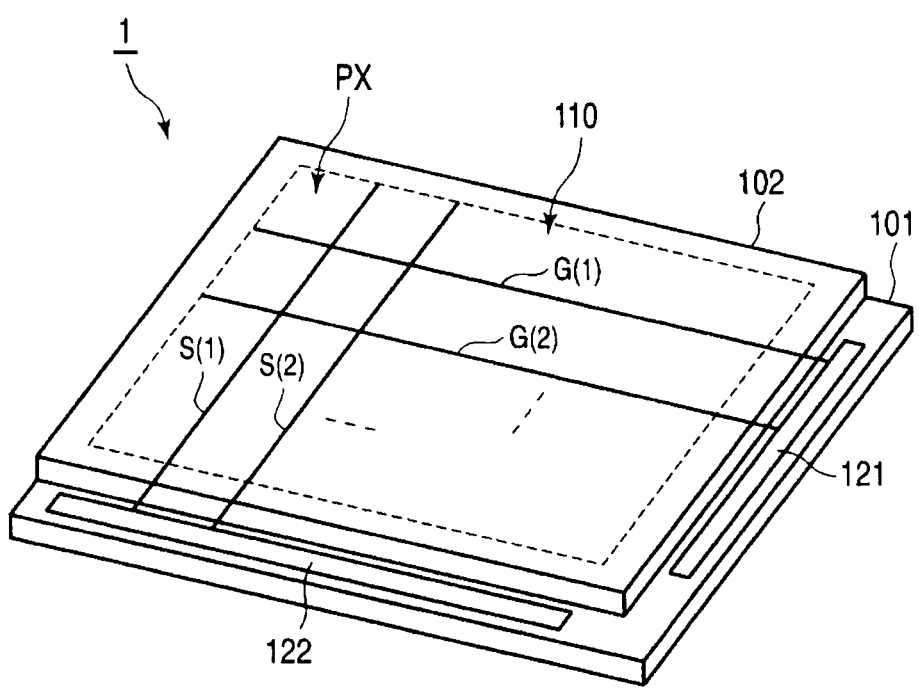
FIG. 1 is a perspective view showing a structure of a liquid crystal display device according to a first embodiment of the present invention.

A liquid crystal display device using a line-inversion driving according to an exemplary embodiment of the present invention, in particular, a liquid crystal display device having auxiliary capacitance lines will now be described with reference to the accompanying drawings wherein the same or like reference numerals designate the same or corresponding parts throughout the several views.

FIG. 1 is a perspective view showing a structure of a liquid crystal display device according to a first embodiment of the present invention. The liquid crystal display device according to the first embodiment includes a pair of substrates opposing each other, that is, an array substrate 101 (first substrate) and a counter substrate 102 (second substrate), a liquid crystal layer held between the substrates and a display area 110 formed of a plurality of pixels PX arranged in a matrix. A scan line driving circuit 121 and a signal line driving circuit 122 in a peripheral region of the display area 110 of the array substrate 101 as driving circuits to drive the pixels PX. In the display area 110, a plurality of scan lines G (G (1), G (2), . . . ) along pixels arranged in a row direction and a plurality of signal lines S (S (1), G (2), . . . ) along the pixels arranged in a column direction. The scan lines G are connected to the scan line driving circuit 121. The signal lines S are connected to the signal line driving circuit 122. The scan line driving circuit 121 and the signal line driving circuit 122 are controlled by a control unit (not shown). The control unit is connected to the array substrate 101 by a flexible circuit board from outside of the array substrate 101.

Figure 2:
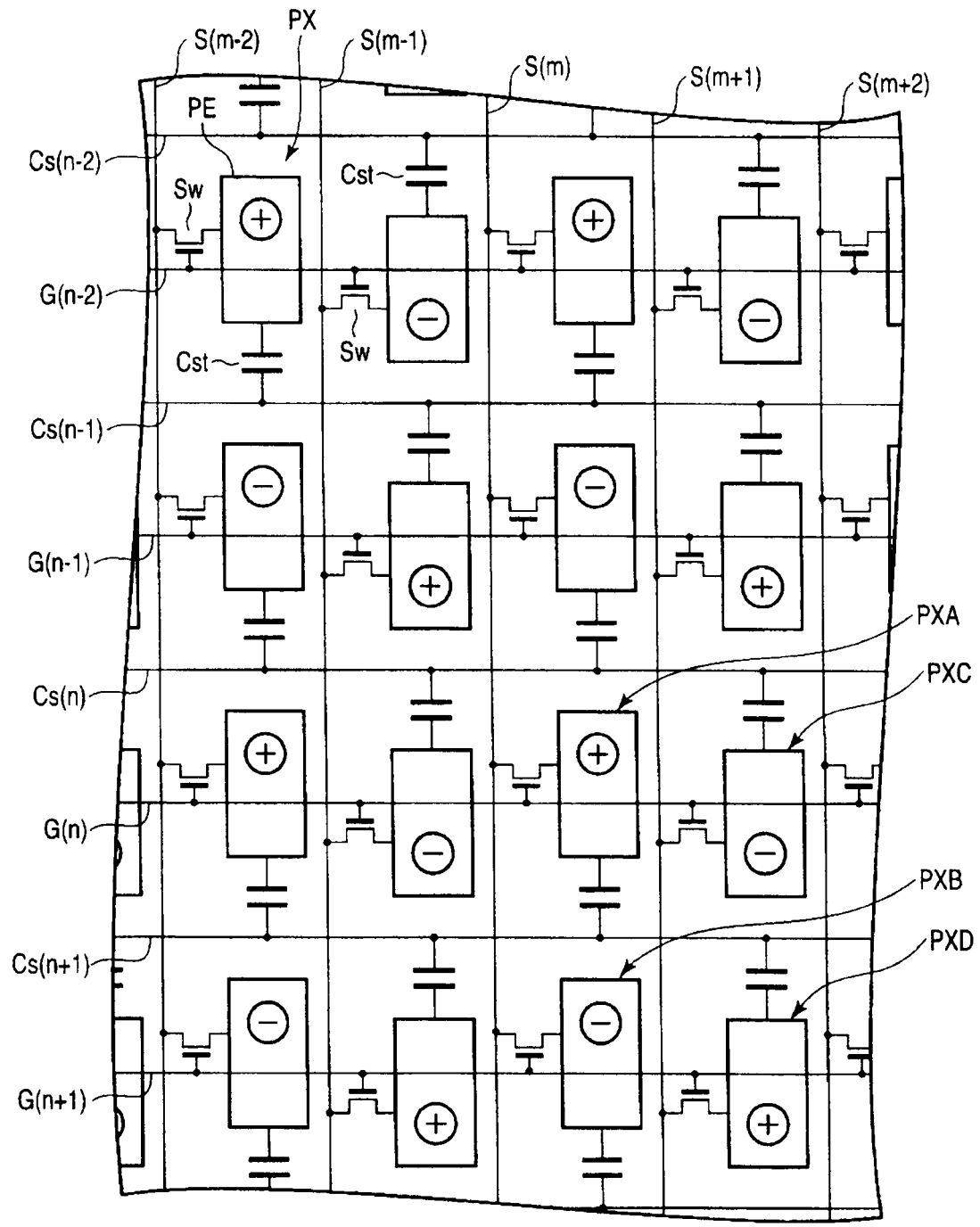
FIG. 2 is a block diagram showing a display area of the liquid crystal display device according to the first embodiment of the present invention.

FIG. 2 is a block diagram showing a display area 110 of the liquid crystal display device according to the first embodiment of the present invention. The pixel PX includes a pixel electrode PE (first electrode) and a pixel switch SW to switch a connection between the pixel electrode PE and the signal line S. The pixel switch SW includes a thin film transistor (TFT) having a gate electrode, a source electrode and a drain electrode. The gate electrode of the pixel switch SW is connected to associated scan line G. A source-drain path of the pixel switch SW is connected between the signal line S and the pixel electrode PE. When "ON" voltage for the pixel switch SW is applied to the scan line G, the source-drain path of the pixel switch SW is rendered conductive and a pixel signal is supplied to the pixel electrode PE from the signal line S. The pixel signal includes an image signal Vs supplied to the pixel electrode PE by an image signal scan operation and a non-image signal Vb applied to the pixel electrode PE by a non-image signal scan operation. The non-image signal Vb corresponds to black display.

In the liquid crystal display device according to this embodiment, the control unit includes a polarity-reversing control unit (not shown) to reverse polarities of the image signal Vs and the non-image signal Vb supplied to the signal lines by controlling the signal line driving circuit 122 in every horizontal scan period. In the image signal scan operation to write the image signals Vs into the pixels PX, the image signals Vs are sequentially written into a plurality of pixels PX on row by row basis. In this case, when an image signal Vs with positive polarity is applied to the signal line S (m) in a horizontal scan period, an image signal Vs with negative polarity is applied to the signal line S (m) in the next horizontal scan period. Similarly, in a non-image signal scan operation to write the non-image signals Vb into the pixels PE, the non-image signals Vb are sequentially written into a plurality of pixels PX in every horizontal scan period. In this case, when a non-image signal Vb with positive polarity is applied to the signal line S (m) in a horizontal scan period, a non-image signal Vb with negative polarity is applied to the signal line S (m) in the next horizontal scan period.

The source electrodes of pixel switches SW of adjacent pixels PX arranged in the column direction are commonly connected to a signal line S. The pixel switches SW of a pixel PXA and a pixel PXB arranged adjacent the pixel PXA in the column direction are commonly connected to the signal line S (m). Similarly, the pixel switches SW of a pixel PXC and adjacent pixel PXD are commonly connected to a signal line S (m+1).

A positive polarity image signal Vs is applied to the pixel electrode PE of the pixel PXA from the signal line S (m) in a horizontal scan period at a timing when the pixel switch SW is "ON". At the same timing as above, a pixel switch SW of the pixel PXC is "ON" and a negative polarity image signal Vs is applied to the pixel electrode PE from the signal line S (m+1).

In a next horizontal scan period, a negative polarity image signal Vs is applied to the pixel electrode PE of the pixel PXB from the signal line S (m) in a horizontal scan period at a timing when the pixel switch SW of the pixel PXB is "ON". At the same timing as above, when a pixel switch SW of the pixel PXD is "ON", a positive polarity image signal Vs is applied to the pixel electrode PE from the signal line S (m+1).

In this embodiment, the image signal write-in operation and the non-image signal write-in operation are simultaneously made in a frame scan period. In the non-image signal write-in operation, as well as the image signal write-in operation, a positive polarity non-image signal Vb is applied to the pixel electrode PE of the pixel PXA from the signal line S (m) in a horizontal scan period at a timing when the pixel switch SW is "ON". At the same timing as above, a pixel switch SW of the pixel PXC is "ON", and a negative polarity non-image signal Vb is applied to the pixel electrode PE from the signal line S (m+1).

In a next horizontal scan period, a negative polarity non-image signal Vb is applied to the pixel electrode PE of the pixel PXB from the signal line S (m) in a horizontal scan period at a timing when the pixel switch SW of the pixel PXB is "ON". At the same timing as above, a pixel switch SW of the pixel PXD is "ON", and a positive polarity non-image signal Vb is applied to the pixel electrode PE from the signal line S (m+1).

In a next frame scan period, the polarities of the image signal Vs and the non-image signal Vb that are applied to the pixel electrodes PE of the pixels PXA, PXB, PXC and PXD are reversed. Respective pixels PX include a pixel capacitance Clc generated by a voltage applied between the pixel electrode PE and a counter electrode (not shown) and an auxiliary capacitance Cst coupled to the pixel capacitance Clc. In the display area 110, a plurality of auxiary capacitance lines Cs to supply an auxiliary capacitance voltage Vcs to the auxisary capacitance Cst are arranged in parallel with the scan lines G. The auxiary capacitance lines Cs are connected to an auxiliary capacitance line driving circuit (not shown). The auxiliary capacitance line driving circuit is controlled by the control unit.

In this embodiment, the auxiliary capacitances Cst of adjacent pixels are connected to different auxiliary capacitance lines Cs each other. For example, the auxiliary capacitance Cst of the pixel PXA is connected to different auxiliary capacitance line Cs from that of the pixel PXC arranged adjacent the pixel PXA in the direction where the scan line G extends. That is, the auxiliary capacitance Cst of the pixel PXA is connected to an auxiliary capacitance line Cs (n+1) and the auxiliary capacitance Cst of the pixel PXC is connected to an auxiliary capacitance line Cs (n).

As mentioned-above, it becomes possible to set the polarities of the auxiliary capacitance voltages Vcs applied to the auxiliary capacitances Cst of adjacent pixels PX by connecting the auxiliary capacitances Cst to different capacitance lines Cs each other.

Figure 3:
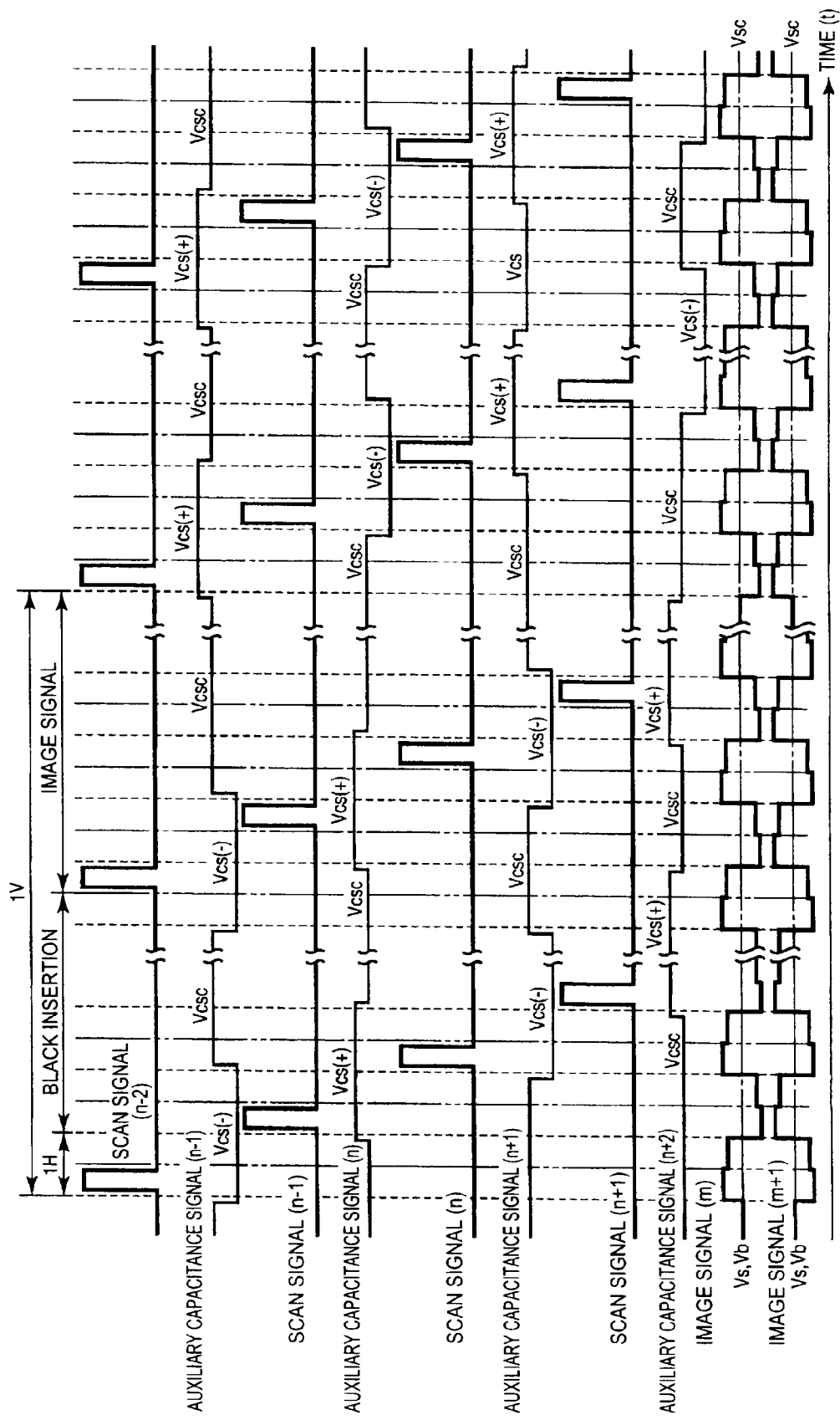
FIG. 3 is a timing chart showing one example of a driving method according to the first embodiment of the present invention.
Figure 4:
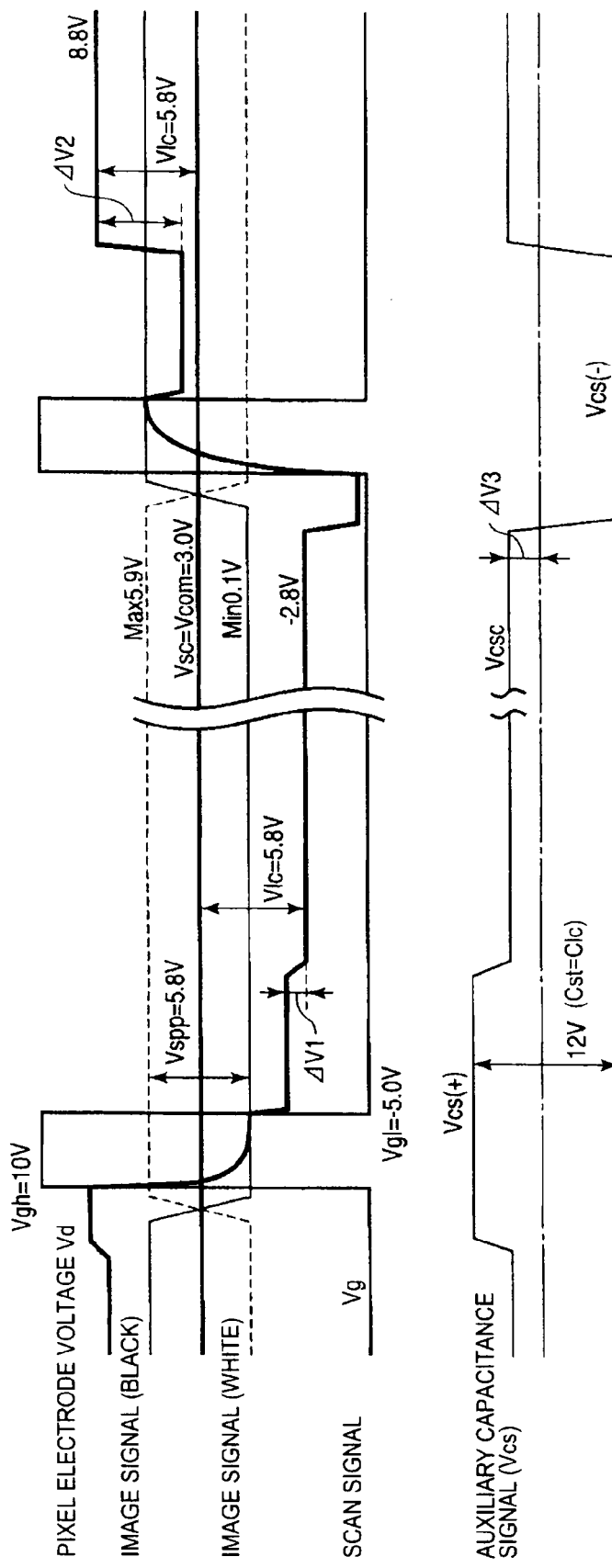
FIG. 4 is a diagram showing a driving operation in an image signal writing period shown in FIG. 3.

Next, a driving method according to this embodiment will be explained referring to FIG. 3. FIG. 3 is a timing chart showing one example of a driving method. In this embodiment, a dot inversion driving is adopted, in which the write-in operations of the image signal Vs and the non-image signal Vb are made in a vertical scan period (1V) and the polarities of the image signal Vs and the non-image signal Vb applied to the signal lines S are reversed in every horizontal scan period (1H). The polarities of the image signal Vs and the non-image signal Vb are the same in every horizontal scan time (1H). The scan line driving circuit 121 sequentially drives the scan lines G. That is, when "ON" voltage Vgh is applied to the pixel switch SW, the source-drain path of the pixel switch SW connected to the scan lines G (n) is rendered conductive. The image signal Vs and the non-image signal Vb applied to the signal lines S change from positive polarity to negative polarity in which image center voltage Vsc is centered for the change as shown in FIGS. 3 and 4.

In this embodiment, the image signal Vs and the non-image signal Vb having different polarities are applied to the adjacent signal lines S. For example, when the image signal Vs (m) applied to the signal lines S (m) is positive, the image signal Vs (m+1) applied to the signal line S (m+1) is negative. Accordingly, when a positive image signal Vs (m) is applied to the pixel electrode PE of the pixel PXA, a negative image signal Vs (m+1) is applied to the pixel electrode PE of the pixel PXC.

Three kinds of auxiliary capacitance voltages Vcs are supplied to the auxiliary capacitance lines Cs. As shown in FIGS. 3 and 4, center voltage Vcsc, positive auxiliary capacitance voltage Vcs (+) and negative auxiliary capacitance voltage Vcs (−) relative to the center voltage Vcsc are supplied to the auxiliary capacitance lines Cs. In this embodiment, auxiliary capacitance voltages Vcs for both the non-image signal write-in operation and the image signal write-in operation in one frame scan period (1V) are almost equal.

When "ON" voltage Vgh to switch on the pixel switch SW is applied to the scan line G (n) in the same vertical scan period (1V), source-drain path of the pixel switch SW connected to the scan line G (n) is rendered conductive. The non-image signal Vb is supplied to the associated pixel electrode PE through the pixel switch SW. For example, a positive non-image signal Vb is applied to the pixel electrode PE of the pixel PXA from the signal line S(m) and a negative non-image signal Vb is applied to the pixel electrode PE of the pixel PXC from the signal line S (m+1).

At this time, auxiliary capacitance signal Vcs having negative polarity is applied to the auxiliary capacitance Cst of the pixel PXA from the auxiliary capacitance line Cs (n+1). Similarly, auxiliary capacitance signal Vcs (+) having positive polarity is applied to the auxiliary capacitance Cst of the pixel PXC from the auxiliary capacitance line Cs (n).

When "ON" voltage Vgh is applied to the scan line G (n) again in the same vertical scan period (1V), a source-drain path of the pixel switch SW connected to the scan line G (n) is rendered conductive. An image signal Vs is applied to associated pixel electrode PE through the pixel switch SW. For example, a positive image signal Vs is applied to the pixel electrode PE of the pixel PXA from the signal line S(m) and a negative image signal Vs (−) is applied to the pixel electrode PE of the pixel element PXC from the signal line S (m+1).

At this time, an auxiliary capacitance voltage Vcs having negative polarity is applied to the auxiliary capacitance Cst of the pixel PXA from the auxiliary capacitance line Cs (n+1). Similarly, auxiliary capacitance voltage Vcs (+) having positive polarity is supplied to the auxiliary capacitance Cst of the pixel PXC from the auxiliary capacitance line Cs (n).

Three kinds of auxiliary capacitance signals having three voltage levels, Vcs (+), Vcs (−) and Vcsc are applied to the auxiliary capacitance lines Cs. When a scan line is selected and "ON" voltage Vgh is applied to the scan line, the auxiliary capacitance line Cs is set at one of the auxiliary capacitance voltages Vcs (+) and Vcs (−) during predetermined period and then set at Vcsc. That is, in a horizontal scan period, when a negative image signal Vs or a non-image signal Vb is applied to a pixel electrode PE, the positive auxiliary capacitance voltage Vcs (+) is applied to the auxiliary capacitance line Cs.

After the negative image signal Vs or the non-image signal Vb is applied to the pixel electrode PE, the auxiliary capacitance voltage Vcs applied to the auxiliary capacitance line Cs changes from the positive capacitance voltage Vcs (+) to the center voltage Vcsc. With the voltage change of the auxiliary capacitance voltage Vcs, a voltage Δ1 of negative polarity side is interposed to the pixel voltage Vd.

In a horizontal scan period, when a positive image signal Vs or a non-display image signal Vb is applied to the pixel electrode PE, the negative auxiliary capacitance voltage Vcs (−) is applied to the auxiliary capacitance line Cs. After the positive image signal Vs or the non-image signal Vb is applied to the pixel electrode PE, the auxiliary capacitance voltage Vcs applied to the auxiliary capacitance line Cs changes from the negative capacitance voltage Vcs (−) to the center voltage Vcsc. With the change of the auxiliary capacitance voltage Vcs, a voltage Δ2 of positive polarity side is interposed to the pixel voltage Vd so as to increase the pixel electrode.

In this embodiment, an auxiliary capacitance signal Vcs having same polarity as the image signal Vs and the non-image signal Vb is interposed to the pixel electrode PE through the auxiliary capacitance Cst by dot inversion driving so as to set the pixel electrode Vd at a predetermined voltage.

Accordingly, it becomes possible to make the amplitude of the image signal Vs and the non-image signal Vb smaller. In the embodiment shown in FIG. 4, the amplitude Vspp of the voltage applied to the signal line S is about 5.8 V. Furthermore, it becomes possible to make the amplitude of the voltage applied to the scan lines G smaller owing to the decrease of the amplitude of the image signal Vs and the non-image signal Vb. Accordingly, low power consumption is achieved. The amplitude of the voltage applied to the scan lines G is about 15V.

The minimum voltage (Min) of the image signal Vs shown in FIG. 4 is a voltage corresponding to white display and the maximum voltage (Max) of the image signal Vs is a voltage corresponding to black display. The image center voltage Vcs is about 3.0 V, the minimum voltage (Min) is 0.1 V and the maximum voltage (Max) is 5.9 V.

In this embodiment, it is possible to make an amplitude of the image signals Vs and the non-image signals Vb small as shown in FIG. 4 though the amplitude of the image signal Vs and the non-image signal Vb becomes large in a case where the pixels are driven without using the auxiliary capacitance Cst. In FIG. 4, the amplitude of the image signal Vs and the non-image signals Vb are 5.8 V, respectively.

As mentioned-above, since the amplitude of the image signal Vs and the non-image signal Vb are smaller in this embodiment, not only reduction of charging time to charge the pixel electrode PE, but high speed driving are achieved, and charge shortage of the pixel electrodes PE is also improved. Furthermore, the common voltage Vcom is set constant having equal voltage value to the image center voltage Vsc of the image signal Vs and the non-image signal Vb. In this embodiment shown in FIG. 4, the voltage values of the counter voltage Vcom and the image center voltage Vsc are about 3.0 V, respectively.

Further, the voltage difference between the auxiliary capacitance voltage Vcs (+) and the center voltage Vcsc is set smaller than that between the center voltage Vcsc and the auxiliary capacitance voltage Vcs (−). That is, the center voltage Vcsc is set at a voltage value raised ΔV3 to positive polarity side from the center voltage value between the auxiliary capacitance voltage Vcs (+) and the auxiliary capacitance voltage Vcs (−). At this time, three kinds of auxiliary capacitance voltages Vcs (+), Vcs (−) and the center voltage Vcsc are set so that the center of voltage Vlc applied to the liquid crystal layer corresponds to the image signal center voltage Vsc of source voltage. The voltage Vlc applied to the liquid crystal layer is voltage difference between the pixel voltage Vd and the counter voltage Vcom.

Practically, the voltage values are given so as to satisfy a following expression:

(Vcsc−(Vcs(+)+Vcs(−))/2)×Cst/Ctot=ΔVg×(Cgd/Ctot)

where,
Cst is an auxiliary capacitance value.
Cgd is a capacitance value generated between the gate electrode and the drain electrode when the pixel switch SW is "OFF".
Ctot is sum of a liquid crystal capacitance Clc, an auxiliary capacitance Cst, a capacitance Csd generated between the source electrode and the drain electrode and a capacitance Cgd.
ΔVg is voltage difference between "ON" voltage and "OFF" voltage of the pixel switch SW.

In the liquid crystal display device according to this embodiment, "OFF" leak current is suppressed and direct current component (DC) is not applied to the liquid crystal layer. Therefore, display persistence or display unevenness is also suppressed.

Figure 5:
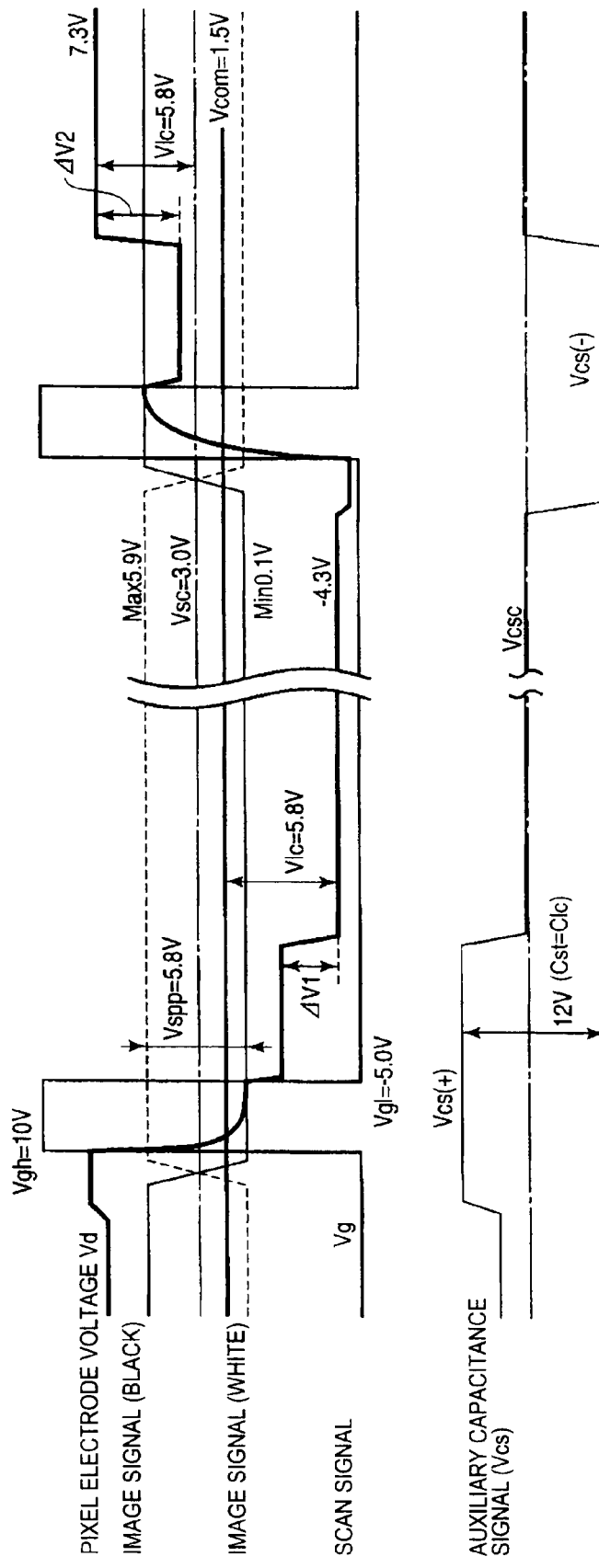
FIG. 5 is a comparison diagram showing a driving operation in an image signal writing period in the liquid crystal display device.

FIG. 5 is a comparison example showing an operation in an image signal writing period. In this example, if the center voltage Vcsc of the auxiliary capacitance voltage Vcs is set at a center voltage value between the voltage level Vcs (+) and Vcs (−), (Vcsc=(Vcs(+)+Vcs(−))/2), the voltage change ΔV1 of the pixel voltage Vd becomes large. Accordingly, the voltage difference between the pixel voltage Vd and the "OFF" voltage Vg1 ("OFF" margin) of the pixel switch SW becomes small. That is, the pixel voltage Vd may be reduced to a voltage which is lower than "OFF" voltage Vg1 of the pixel switch SW by accidental error of the scan signal Vg or the auxiliary capacitance voltage Vcs.

Conversely, in this embodiment, the voltage difference between the auxiliary capacitance Vcs (+) and the center voltage Vcsc is set smaller than that between the auxiliary capacitance voltage Vcs (−) and the center voltage Vcsc. Accordingly, when the auxiliary capacitance voltage Vcs changes from the auxiliary capacitance voltage Vcs (+) to the center voltage Vcsc, the voltage change ΔV1 of the pixel voltage Vd, ((Vcs(+)−Vcsc)×Cst/Ctot) becomes smaller than that of the comparison example shown in FIG. 5. Accordingly, even if a voltage is interposed to the pixel electrode PE by the auxiliary capacitance Cst, the generation of current leak ("OFF" leak) from the pixel switch SW is suppressed and it becomes possible to prevent reduction of the voltage applied to the liquid crystal layer.

Furthermore, the center voltage of the pixel voltage Vd applied to the liquid crystal layer can be coincided to the common voltage Vcom by giving voltage values so as to satisfy a following expression:

(Vcsc−(Vcs(+)+Vcs(−))/2×Cst/Ctot=(Vgh−Vg1)×Cgd/Ctot

Therefore, the "OFF" leak current is suppressed and the direct current component (DC) is not applied to the liquid crystal layer. Therefore, display persistence or display unevenness is also suppressed. In the embodiment shown in FIG. 4, the maximum voltage of the pixel electrode Vd is 8.8 V, and minimum voltage is −2.8 V, and the center voltage between the maximum voltage and minimum voltage is 3.0 V. The center voltage corresponds to the common voltage Vcom.

According to this embodiment, the center voltage applied to the liquid crystal layer to display black coincides to that applied to the liquid crystal display layer when the image signals are written. Therefore, the generation of display persistence and display unevenness due to the application of direct current component can be suppressed.

According to the present invention, a high quality liquid crystal display device is provided, in which reduction of power consumption and prevention of degradation of display quality are achieved.

In this embodiment, the CCDI driving is adopted. However, same effect may be obtained in the CC driving or CCCI driving in which the source signal is reversed in every one frame scan period by setting the auxiliary capacitance voltage values as described above.

Further, the signal voltage values used in the embodiment are examples. Therefore, other voltage values may be used as far as the relationship among the voltage values is satisfied as shown in the embodiments according to the present invention.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed.

What is claimed is:

1. A liquid crystal display device comprising:
an array substrate and a counter substrate facing each other;
a liquid crystal layer interposed between the array substrate and the counter substrate;
a display area formed of the array substrate, the counter substrate and the liquid crystal layer and including a plurality of pixels arranged in a matrix;
a driving unit to drive the plurality of pixels connected to signal lines and scan lines arranged in a matrix;
a pixel electrode provided to each pixel;
a common electrode formed on the counter substrate and facing the pixel electrode;
an auxiliary capacitance provided to each pixel to interpose an auxiliary capacitance signal to the pixel electrode; and
auxiliary capacitance lines arranged along the pixels in a row direction and connected to the auxiliary capacitance of the pixel;
wherein the driving unit includes an auxiliary capacitance line driving circuit to supply a first voltage, a second voltage smaller than the first voltage and a third voltage smaller than the second voltage to the auxiliary capacitance lines, and the voltage difference between the first voltage and the second voltage is smaller than that between the second voltage and the third voltage;
wherein the pixel includes a pixel switch connected to the pixel electrode, the pixel switch including a gate electrode connected to the scan line, a source electrode connected to the signal line and a drain electrode connected to the pixel electrode;
wherein an image signal is written into the pixel electrode through the pixel switch and a common voltage is supplied to the common electrode;
wherein the common voltage corresponds to respective center voltages of the image signal and a voltage applied to the liquid crystal layer;
wherein the voltage values are given so as to satisfy a following expression:

$(V2-(V1+V3)/2) \times Cst/Ctot = \Delta Vg \times (Cgd/Ctot)$, wherein,
V1, V2 and V3 are first, second and third voltages, respectively;
Cst is an auxiliary capacitance value;
Cgd is a capacitance value generated between the gate electrode and the drain electrode when the pixel switch is "OFF";
Ctot is sum of a liquid crystal capacitance, an auxiliary capacitance value Cst, a capacitance generated between the source electrode and the drain electrode and the capacitance value Cgd;
$\Delta Vg$ is voltage difference between "ON" voltage and "OFF" voltage of the pixel switch.

2. A liquid crystal display device comprising:
an array substrate and a counter substrate facing each other and including a liquid crystal layer interposed between the array substrate and the counter substrate;
a display area formed of the array substrate, the counter substrate and the liquid crystal layer and including a plurality of pixels arranged in a matrix;
a plurality of signal lines arranged along the pixels in a column direction;
a plurality of scan lines arranged along the pixels in a row direction;
a pixel electrode connected to each of the pixels, the pixel electrode being connected to the signal line through a pixel switch;
a common electrode formed on the counter substrate and facing the pixel electrode;
a driving unit connected to the signal lines and the scan lines to drive the plurality of pixels;
a signal line driving circuit formed in the driving unit to sequentially apply an image signal and a non-image signal to the signal lines;
a scan line driving circuit formed in the driving unit to conduct an image signal write-in operation and a non-image signal write-in operation in a vertical scan period;
an auxiliary capacitance provided to each pixel to interpose an auxiliary capacitance signal to the pixel electrode;
a plurality of auxiliary capacitance lines arranged along the pixels in a row direction and connected to the respective auxiliary capacitances of the pixels; and
an auxiliary capacitance line driving circuit formed in the driving unit;
wherein the auxiliary capacitance line driving circuit changes the auxiliary capacitance signal to the same polarity side of the image signal and the non-image signal after finishing the write-in operations of the image signal and the non-image signal to the selected pixel;
wherein the auxiliary capacitance line driving circuit supplies a first voltage, a second voltage smaller than the first voltage and a third voltage smaller than the second voltage to the auxiliary capacitance lines, and the voltage difference between the first voltage and the second voltage is smaller than that between the second voltage and the third voltage;
wherein the non-image signal is applied to the signal line to display black;
wherein the pixel switch includes a gate electrode connected to the scan line, a source electrode connected to the corresponding signal line and a drain electrode connected to the pixel electrode;
wherein the image signal and the non-image signal are written into the pixel electrode through the pixel switch and a common voltage is supplied to the common electrode;
wherein the common voltage corresponds to respective center voltages of the image signal, the non-image signal and a voltage applied to the liquid crystal layer;
wherein the voltage values are given so as to satisfy a following expression:

$(V2-(V1+V3)/2) \times Cst/Ctot = \Delta Vg \times (Cgd/Ctot)$, wherein,
V1, V2 and V3 are first, second and third voltages, respectively;
Cst is an auxiliary capacitance value;
Cgd is a capacitance value generated between the gate electrode and the drain electrode when the pixel switch is "OFF";
Ctot is sum of a liquid crystal capacitance, an auxiliary capacitance value Cst, a capacitance generated between the source electrode and the drain electrode and the capacitance value Cgd;

ΔVg is voltage difference between "ON" voltage and "OFF" voltage of the pixel switch.

3. A liquid crystal display device comprising:
an array substrate and a counter substrate facing each other;
a liquid crystal layer interposed between the array substrate and the counter substrate;
a display area formed of the array substrate, the counter substrate and the liquid crystal layer and including a plurality of pixels arranged in a matrix;
a plurality of signal lines and scan lines arranged in matrix, the pixels being located near intersections between the signal lines and the scan lines;
a driving unit to drive the plurality of pixels connected to the signal lines and the scan lines;
a pixel electrode provided to each pixel;
a common electrode formed on the counter substrate and facing the pixel electrode;
an auxiliary capacitance provided to each pixel to interpose an auxiliary capacitance signal to the pixel electrode; and
auxiliary capacitance lines arranged along the pixels in a row direction and connected to the auxiliary capacitance of the respective pixels;
wherein the respective auxiliary capacitances of adjacent pixels arranged in the row direction are connected to different auxiliary capacitance lines respectively;
wherein the driving unit includes an auxiliary capacitance line driving circuit to supply a first voltage, a second voltage smaller than the first voltage and a third voltage smaller than the second voltage to the auxiliary capacitance lines, and the voltage difference between the first voltage and the second voltage is smaller than that between the second voltage and the third voltage;
wherein the pixel switch includes a gate electrode connected to the scan line, a source electrode connected to the corresponding signal line and a drain electrode connected to the pixel electrode;
wherein an image signal and a non-image signal are written into the pixel electrode through the pixel switch and a common voltage is supplied to the common electrode;
wherein the common voltage corresponds to respective center voltages of the image signal, the non-image signal and a voltage applied to the liquid crystal layer;
wherein the voltage values are given so as to satisfy a following expression:

$$(V2-(V1+V3)/2) \times Cst/Ctot = \Delta Vgx(Cgd/Ctot),$$

wherein,
V1, V2 and V3 are first, second and third voltages, respectively;
Cst is an auxiliary capacitance value;
Cgd is a capacitance value generated between the gate electrode and the drain electrode when the pixel switch is "OFF";
Ctot is sum of a liquid crystal capacitance, an auxiliary capacitance value Cst, a capacitance generated between the source electrode and the drain electrode and the capacitance value Cgd;
ΔVg is voltage difference between "ON" voltage and "OFF" voltage of the pixel switch.

4. A method for driving a liquid crystal display device including a liquid crystal layer and a plurality of pixels arranged near intersections between signal lines and scan lines in a matrix, comprising:
providing a driving unit to drive the plurality of pixels each having a pixel switch connected to the signal line and the scan line;
forming auxiliary capacitances in the respective pixels;
providing auxiliary capacitance lines arranged along the pixels and connected to the auxiliary capacitances;
supplying a first voltage, a second voltage smaller than the first voltage, a third voltage smaller than the second voltage to the auxiliary capacitance lines, and the voltage difference between the first voltage and the second voltage being smaller than that between the second voltage and the third voltage;
wherein the pixel includes the pixel switch connected to a pixel electrode, the pixel switch including a gate electrode connected to the scan line, a source electrode connected to the corresponding signal line and a drain electrode connected to the pixel electrode;
wherein an image signal is written into the pixel electrode through the pixel switch and a common voltage is supplied to a common electrode;
wherein the common voltage corresponds to respective center voltages of the image signal and a voltage applied to the liquid crystal layer;
wherein the voltage values are given so as to satisfy a following expression:

$$(V2-(V1+V3)/2) \times Cst/Ctot = \Delta Vgx(Cgd/Ctot)$$

wherein,
V1, V2 and V3 are first, second and third voltages, respectively;
Cst is an auxiliary capacitance value;
Cgd is a capacitance value generated between the gate electrode and the drain electrode when the pixel switch is "OFF";
Ctot is sum of a liquid crystal capacitance, an auxiliary capacitance value Cst, a capacitance generated between the source electrode and the drain electrode and the capacitance value Cgd;
ΔVg is voltage difference between "ON" voltage and "OFF" voltage of the pixel switch.

5. The method for driving the liquid crystal display device according to claim 4, wherein the respective auxiliary capacitances of adjacent pixels arranged in a row direction are connected to different auxiliary capacitance lines.

* * * * *